UNITED STATES PATENT OFFICE.

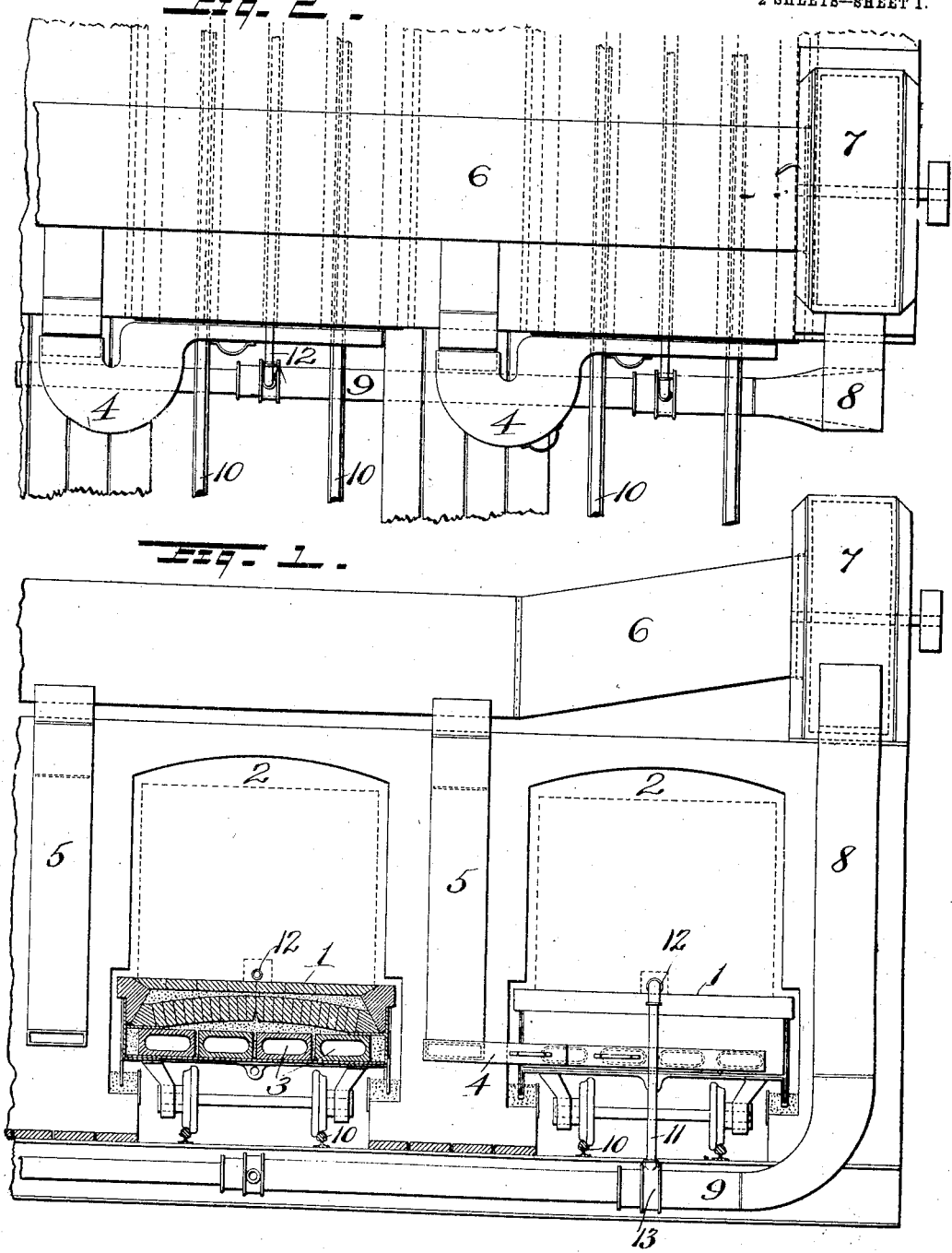

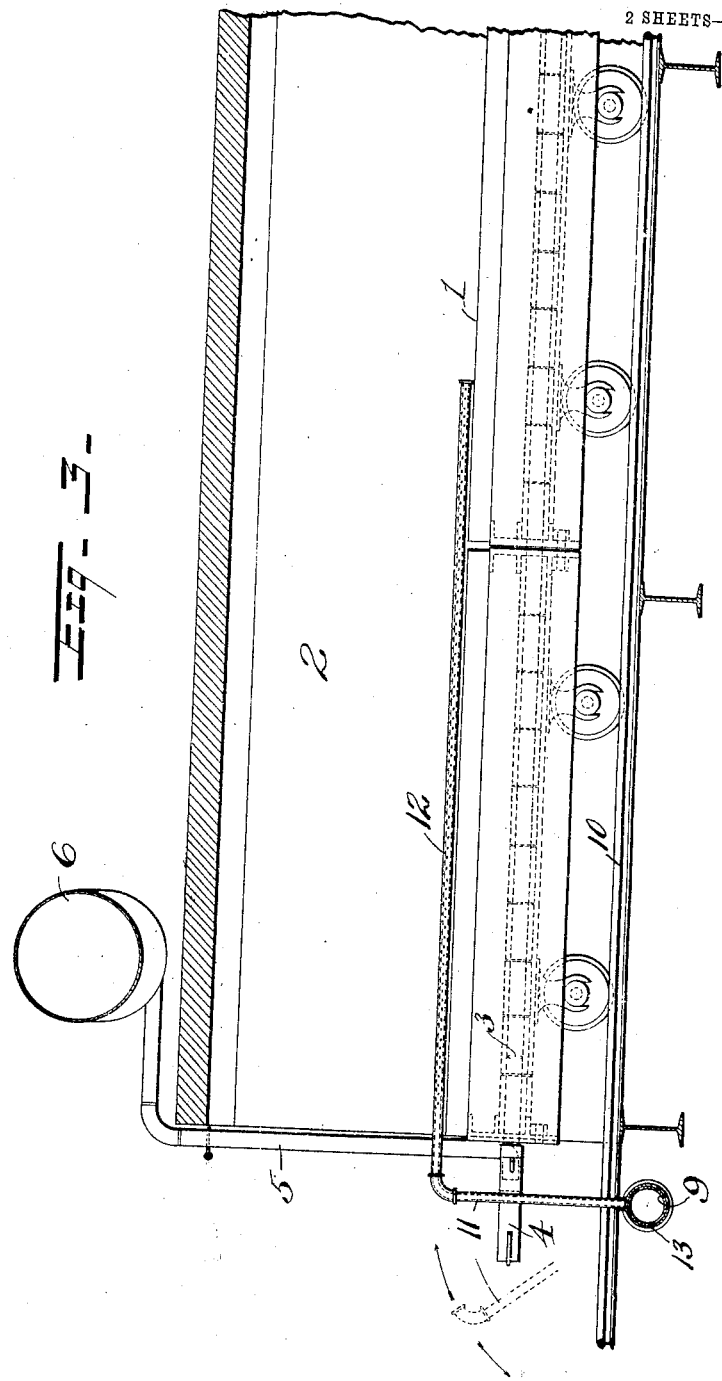

ALBERT A. GERY, OF READING, PENNSYLVANIA.

MANUFACTURING BRICKS, &c.

No. 839,832.  Specification of Letters Patent.  Patented Jan. 1, 1907.

Application filed January 24, 1905. Serial No. 242,500.

*To all whom it may concern:*

Be it known that I, ALBERT A. GERY, a citizen of the United States, residing in the city of Reading, county of Berks, and State of Pennsylvania, have invented certain new and useful Improvements in Manufacturing Brick, &c., of which the following is a specification.

My invention relates to the burning of brick or other material in tunnel-kilns through which they are slowly progressed while being successively subjected to drying, heating, burning, and cooling treatment. In this method of burning, as fully described in my pending applications, Serial Nos. 228,128 and 230,001, the green material which is periodically introduced at the entrance end of the tunnel is gradually dried and heated as it progresses toward the inner tunnel, where it is subjected to intense burning heat and is then gradually cooled as it progresses to the exit end, the tunnel being constantly filled with material in different stages of the burning treatment and said material being carried upon a moving tunnel-floor, preferably made up of a series of closely-connected cars.

The main objects of my present invention are, first, to promptly and effectively expel the moisture from the lower layers of incoming brick by heating the movable floor upon which they are carried; second, to abstract heat from the lower layers of outgoing brick by cooling the movable floor in the outgoing portion of the tunnel; third, to reduce the excessive heat beneath the movable floor in the inner tunnel; fourth, to utilize such heat for the first-mentioned purpose of indirectly drying the lower layers of incoming brick, and, fifth, to further utilize the heat-carrying current of air directly in the incoming end of the tunnel.

The invention is fully described in connection with the accompanying drawings, illustrating a preferred means of carrying the same into effect, and is specifically pointed out in the claims.

Figure 1 is a front elevation showing the entrance ends of two contiguous parallel tunnels with the last-entered loaded cars in position therein, one of said cars being shown in cross-section and the end of the other showing the subsurface longitudinal air-passages thereof connected to the tunnel delivery air-pipes. Fig. 2 is a diagrammatic plan view of the entrance ends of the tunnels, further indicating the arrangement of the air-pipes. Fig. 3 indicates, partly in longitudinal section, a series of connected floor-sections traveling on car-tracks, together with the conducting air-pipes and spray blast-pipe, communicating with the subsurface air-passages in the floor.

In carrying out my invention the car-floors 1, upon which the brick or other material is introduced to and passed through a tunnel 2 and which jointly form the moving floor of the tunnel, are provided with longitudinal air-passages 3 below the floor-surface, each arranged in communication with those of adjoining floor-sections throughout the closely-connected series within the tunnel to form a continuous passage or passages through the whole train. Atmospheric air is drawn into these passages through the foremost car of the train at the exit end of the tunnel and flows rearward through the train, abstracting heat first from the outgoing floor-sections and the cooling brick thereon and thereafter from the inner tunnel floor-sections, upon which the burning brick are piled, and carrying such heat to the entrance end of the tunnel, where it is in large measure imparted to the incoming floor-sections, thereby indirectly heating the lower layers of brick piled upon said sections and insuring the prompt driving off of moisture therefrom, which is essential to the securing of uniform and satisfactory results in all stages of the burning operation.

As shown in the drawings, the last-entered car of each tunnel series has a connecting air-pipe 4 removably attached to its rear end, so as to afford communication between the air-passages 3 of the connected floor-sections, and a fixed vertical air-pipe 5 on the tunnel-face, which latter in turn communicates with a transverse pipe 6, connected in like manner to each of a group of parallel tunnels. This pipe 6 leads to a fan-chamber 7, from which extends a main blast-pipe 8, having a longitudinal extension 9 arranged along the face of the tunnels below the car-track 10. To this horizontal main at each tunnel a branch blast-pipe is connected, comprising a vertical portion 11 and a horizontal portion 12, extending into the tunnel, the latter being properly arranged at such height as to permit the movable floor-sections to pass under it. This blast-pipe 12, as indicated, extends into the tunnel and discharges the heated air into the drying brick carried upon the last-entered cars. This heated air is preferably delivered in the form of a spray-blast through suitable perforations or openings and serves the purpose of effectively carrying the moisture expelled from the brick to a stack or exhaust-fan (not shown) provided for removing it from the tunnel, as particularly described in my pending applications referred to.

To provide for conveniently introducing additional car-loads of material ar required, each vertical portion 11 of the branch blast-pipe is so connected to the main 9 as to permit of its being readily thrown out of the path of an entering car, this being effected, as indicated in the drawings, by connecting it to a turn-sleeve 13 on the main, which sleeve has an opening for the branch pipe 11, that is adapted to register with an outlet in the main only when the branch pipe is in vertical position, the throwing of the pipe 11 out of the way thus serving to close said outlet. The horizontal spray blast-pipe 12 when disconnected may lie upon the connected car-floors, the brick being so piled upon the latter as to provide a clearance-way therefor. Thus in introducing a new car into the tunnel-kiln both the vertical branch 11 of the blast-pipe and the connecting air-pipe 4 to the floor-section passages are temporarily removed, but are reconnected when the new car is in position.

During the normal operation cool atmospheric air enters the connected floor-passages 3 at the exit end of the tunnel, traverses the whole length of the train, successively abstracting heat from the outgoing and inner tunnel-sections and imparting it to the incoming sections, and is then drawn into the fan-chamber and finally discharged into the tunnel, the effect being, as already explained, first, to assist in cooling the outgoing brick; second, to carry off the excessive heat below the burning brick in the inner tunnel, and thereby reduce the heating of the running-gears and the discomfort of working below the same; third, to utilize such heat both indirectly and directly upon the incoming green brick so as to insure prompt and thorough drying, particularly of the lower layers of the latter, and, finally, to hasten the burning operation and insure more uniform and high-grade product.

What I claim is—

1. The improvement in continuously drying burning and cooling brick and the like in a single tunnel-kiln which consists in producing a current of air beneath the brick-supporting floor-surface from the exit end thereto to the entrance end, and utilizing said current to successively abstract heat from the outgoing floor-sections and to indirectly and directly heat the incoming brick.

2. The improvement in continuously drying burning and cooling brick and the like in a single tunnel-kiln which consists in abstracting heat from the outgoing piled brick through the brick-supporting-floor sections and heating the incoming-brick-supporting-floor sections by means of such abstracted heat to dry the lower courses of incoming brick.

3. The combination with a tunnel-kiln of a movable brick-carrying floor therefor made up of abutting sections having imperforate brick-supporting beds and longitudinal subsurface air-passages arranged in communication with each other.

4. The combination with a tunnel-kiln of a movable brick-carrying floor therefor made up of abutting sections having imperforate brick-supporting beds and longitudinal subsurface air-passages arranged in communication with each other and means for creating an air-current through said communicating hollow floor-sections in reverse direction to the floor movement.

5. The combination with a tunnel-kiln and a movable brick-carrying floor therefor made up of hollow sections forming a continuous longitudinal subsurface air-passage, of means for creating an air-current through said passage in reverse direction to the floor movement, and means for delivering said air into the entrance portion of the tunnel.

6. The combination with a tunnel-kiln and a movable brick-carrying floor therefor made up of hollow sections forming a continuous longitudinal subsurface air-passage, of fixed air-conduits at the entering end of the tunnel, a connecting-conduit to the last-entered floor-section, a delivery-conduit extending into the tunnel, and means for maintaining an air-current through said passage and conduits substantially as set forth.

7. The combination with a tunnel-kiln and a movable brick-carrying floor therefor made up of hollow sections forming a continuous longitudinal subsurface air-passage, of means for creating an air-current through said passage in reverse direction to the floor movement, and means for delivering said air into the entrance portion of the tunnel comprising a delivery-conduit extending into the tunnel and a movable connection between said delivery-conduit and a fixed conduit, substantially as set forth.

8. The improvement in continuously drying burning and cooling brick and the like in a single tunnel-kiln which consists in utilizing heat imparted by the burned brick to the outgoing floor-sections by abstracting the same from said floor-sections by means of a reverse air-current and imparting it from said air-current to the incoming brick.

9. The improvement in continuously drying burning and cooling brick and the like in a single tunnel-kiln which consists in utilizing heat imparted by the burned brick to the outgoing floor-sections by abstracting the same from said floor-sections by means of a reverse air-current and imparting it from said air-current to the incoming floor-sections to indirectly heat the brick thereon.

10. The improvement in continuously drying burning and cooling brick and the like in a single tunnel-kiln which consists in utilizing heat imparted by the burned brick to the outgoing floor-sections by abstracting the same from said floor-sections by means of a reverse air-current and imparting it from said air-current first to the incoming floor-sections to indirectly heat the brick thereon, and thereafter directly to the incoming brick.

In testimony whereof I affix my signature in the presence of two witnesses.

ALBERT A. GERY.

Witnesses:
D. M. STEWART,
W. G. STEWART.